E. J. YOUNG.
GRINDER FOR ENSILAGE CUTTER AND OTHER KNIVES.
APPLICATION FILED SEPT. 26, 1910.
999,943.
Patented Aug. 8, 1911.
5 SHEETS—SHEET 2.
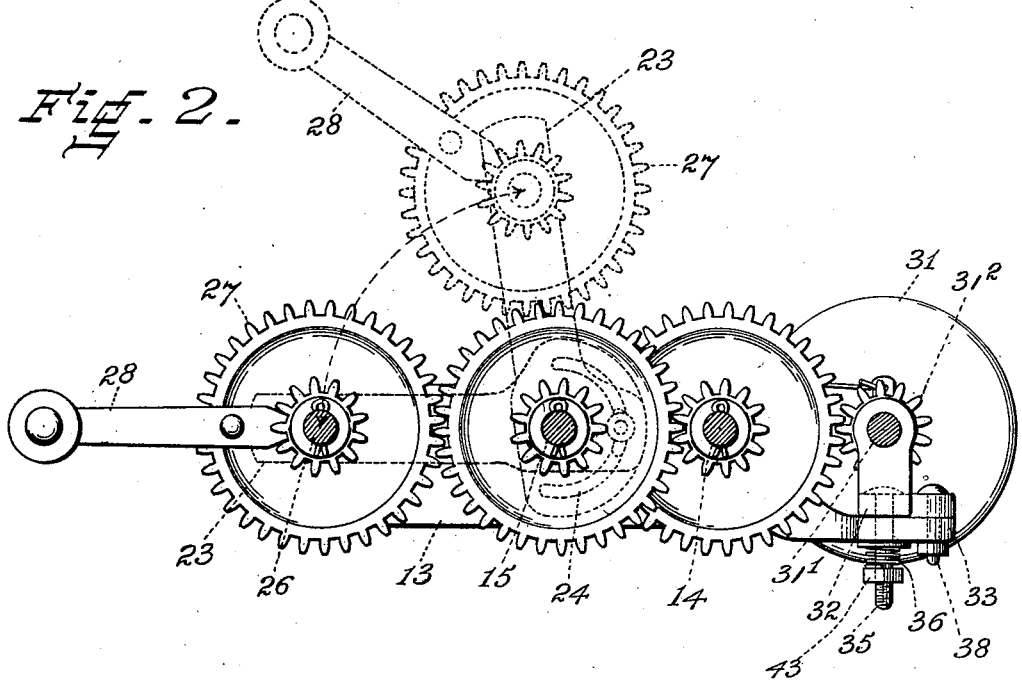
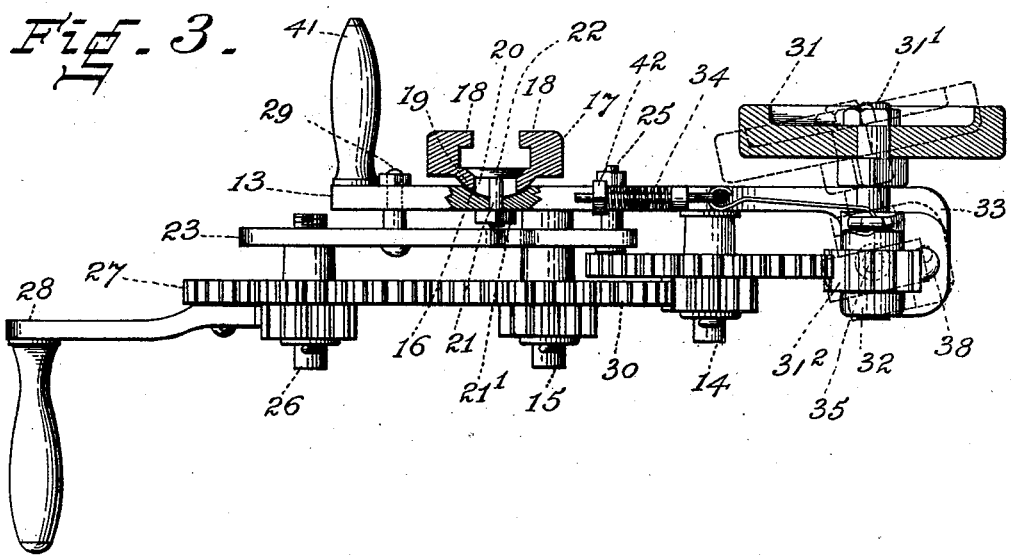
Witnesses:
J. Walter Ackerman
John E. Stapleton
Inventor:
Ernest John Young,
By Frank R. Rathbun,
Attorney.

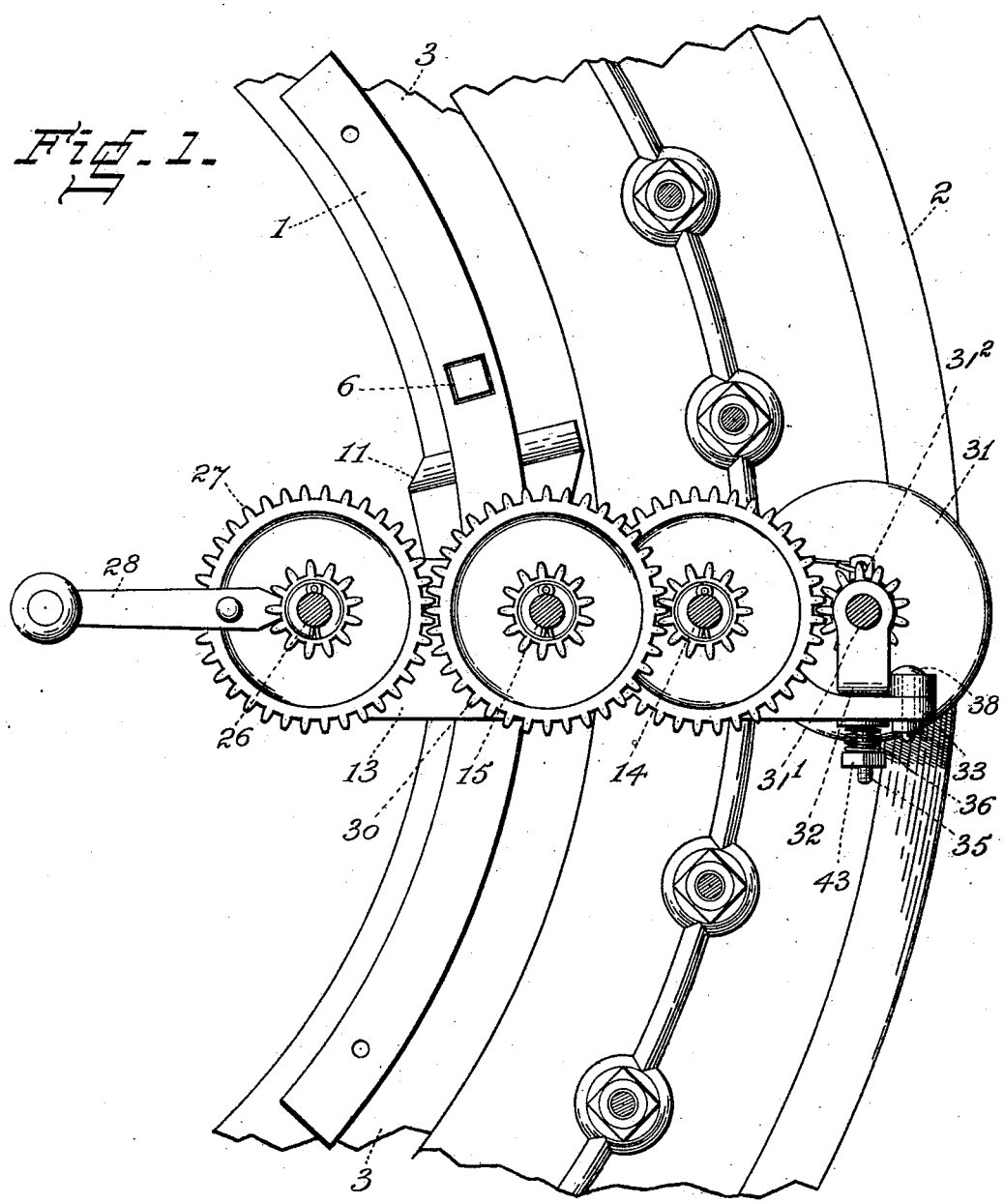

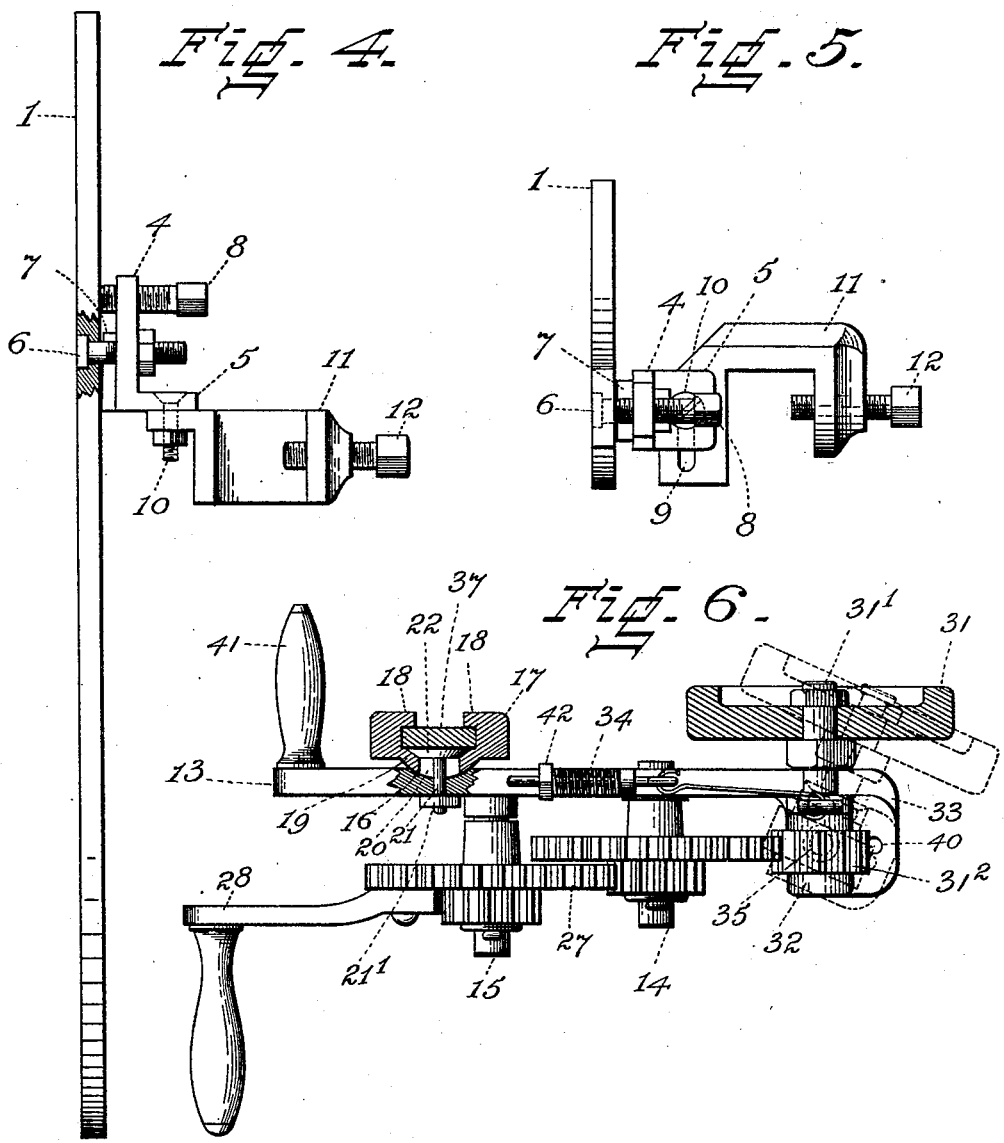

E. J. YOUNG.
GRINDER FOR ENSILAGE CUTTER AND OTHER KNIVES.
APPLICATION FILED SEPT. 26, 1910.
999,943.
Patented Aug. 8, 1911.
5 SHEETS—SHEET 4.
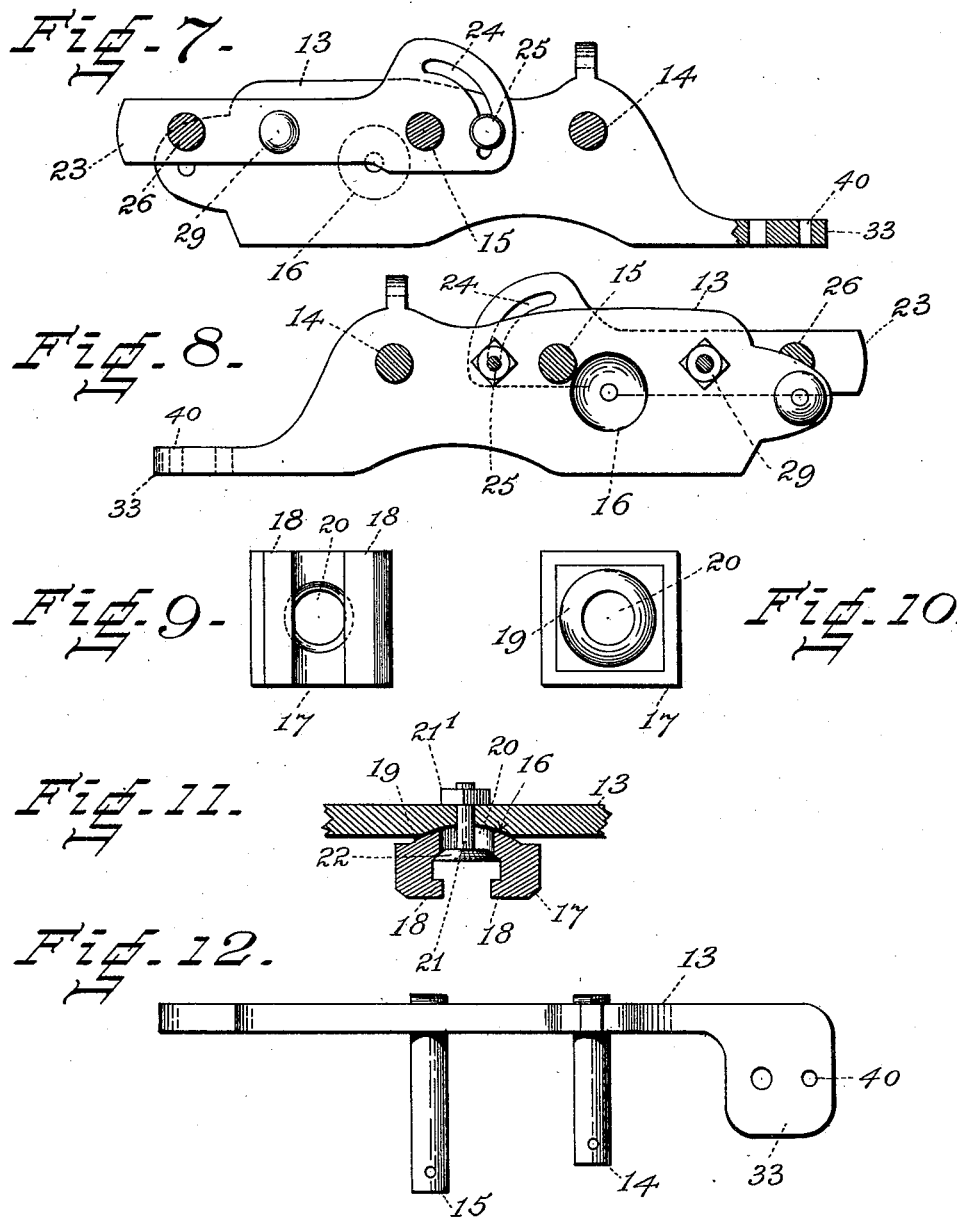
Witnesses:
J. Walter Ackerman
John E. Stapleton
Inventor:
Ernest John Young,
By Frank R. Rathbun,
Attorney.

E. J. YOUNG.
GRINDER FOR ENSILAGE CUTTER AND OTHER KNIVES.
APPLICATION FILED SEPT. 26, 1910.
999,943.
Patented Aug. 8, 1911.
5 SHEETS—SHEET 5.
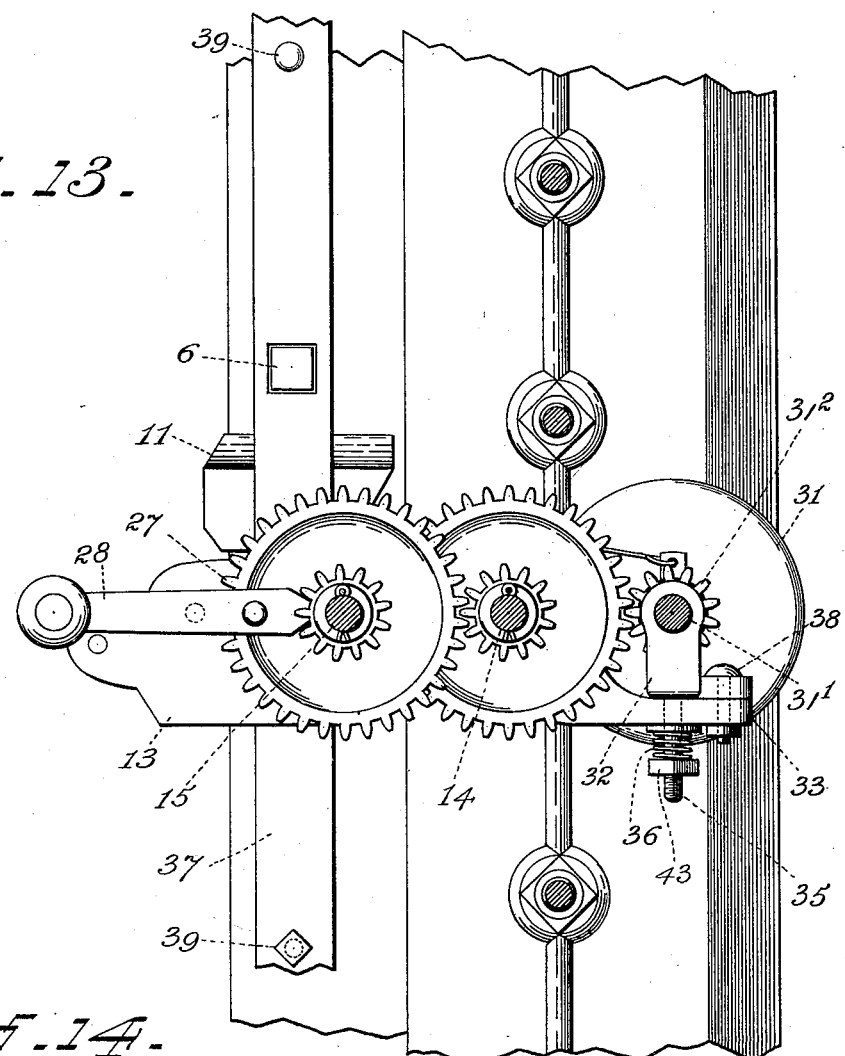
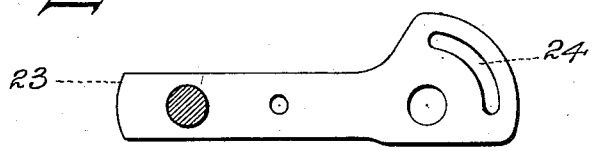
Witnesses:
J. Walter Ackerman
John E. Stapleton
Inventor:
Ernest John Young,
By Frank R. Rathbun,
Attorney.

UNITED STATES PATENT OFFICE.

ERNEST JOHN YOUNG, OF FLEMING, NEW YORK.

GRINDER FOR ENSILAGE-CUTTER AND OTHER KNIVES.

999,943. Specification of Letters Patent. Patented Aug. 8, 1911.

Application filed September 26, 1910. Serial No. 583,794.

*To all whom it may concern:*

Be it known that I, ERNEST JOHN YOUNG, citizen of the United States, residing at Fleming, in the county of Cayuga and State of New York, have invented certain new and useful Improvements in Grinders for Ensilage-Cutter and other Knives, of which the following is a specification.

My invention relates to improvements in a grinder for ensilage cutter knives for which an application for a patent was filed by me on the 3d day of December, 1909, with the Serial Number 531,075, and passed to an allowance on the 14th day of March, 1910, and consists of a device for sharpening variously shaped knives of ensilage cutter and other machines without having to remove them from their normal operative cutting position on the machine.

The objects of my improvements are first: to provide a single guide for guiding the driving and grinding parts and conforming to the shape or contour of the cutting edge of the knife being sharpened; second: to afford the clamping parts,—by means of which the said single guide-bar is fastened on the machine,—a wider range for adjustment with relation to the cutting edge of the cutter; third: to provide in the main supporting piece which carries the driving and grinding parts, a universal yieldability relative to the said single guide-bar; fourthly: to render it feasible for the driving parts of the driving mechanism to be thrown to a position where their operative path may not interfere or be obstructed by adjacent parts of the ensilage cutting machine and, lastly: to furnish means for changing the abrasive or grinding wheel from a normally yieldable, to a fixed position in its grinding office, on the cutting edges of the cutters other than those of ensilage cutting machines.

I attain the above objects by the peculiar mechanism shown in the accompanying set of drawings on five sheets, in which:

Figure 1 shows a side elevation of my improvement carried on a curved guide bar fastened in operative position on the arm of a cutter wheel of an ensilage cutter the knives of which have a uniform curved contour therewith. Fig. 2, is a side elevation of the driving train and grinding parts removed from the curved guide-bar, the dotted parts thereof showing how the driving members can be upwardly swung so their rotative action shall not interfere with parts of the ensilage cutter that otherwise might obstruct their movement. Fig. 3, is a plan view of Fig. 2. Fig. 4, is an edgewise view,— and in elevation,—of a curved guide-bar with its clamping appliances shown in position thereon. Fig. 5, is a plan view of Fig. 4. Fig. 6, is a plan view of the main supporting piece that carries the driving train and the grinding wheel, and in the dotted lines shows the said grinding wheel released from a fixed or stationary grinding position so it can yieldably operate against the cutting edge of the knife. Fig. 7, is an elevation of one side of the supporting piece with the part controlling the throw of the driving parts. Fig. 8 is an elevation of the side of the supporting piece opposite to that shown in Fig. 7. Fig. 9, is an elevation of one side of the way-piece in which the guide-bar passes. Fig. 10, is an elevation of the side of the way-piece opposite to that shown in Fig. 9. Fig. 11, is a section showing how the way-piece shown in Figs. 9, and 10, may be carried at one side of the supporting piece. Fig. 12, is a plan view of the supporting piece. Fig. 13, is a side elevation of the grinder and its connected driving parts and is seen carried on a guide-bar of straight pattern attached in working place on the ensilage cutter wheel, and: Fig. 14, is an elevation of the piece or part which controls the upwardly throw of the driving crank and wheel, stripped from its normal position on the main supporting piece.

Similar reference figures refer to similar parts in the different figures.

In Fig. 1, 1, shows a single curved guide-bar conforming in shape to the contour of the cutting part of the knife 2, which is carried on the arm 3, of the cutter wheel of the ensilage cutting machine. At a convenient operative point on the single guide bar 1, is carried an angled piece consisting of an upright part 4, and a foot 5. It is secured on one side of the single guide bar 1, by a bolt 6, the head of which is sunk in said guide bar even with the surface thereof. The said upright part 4, is provided on the side next the guide-bar 1, with a tapered lug 7, the object of which will presently be evident, and its top end has threaded into it an adjusting bolt 8. The foot part 5, of the said angled piece is provided with a bolt 10, which passes in a slot 9, provided in a clamping piece 11, securing it movably on its under side, and which said clamping piece is furnished with a clamping bolt 12, for securing it to the arm 3, of the cutter wheel.

A supporting piece 13, the primary office of which is to support the driving and grinding parts, is provided and clearly shown in Figs. 6, 7, and 8. It is provided with studs 14, 15, which serve as bearing shafts on which members of a driving train of gear or sprocket wheels rotate; and on its side next to which the guide bar is carried, is provided a concaved seat 16,—see Figs. 8, and 9,—in which is seated the way piece 17, thus practically forming a universal joint between the two. The construction and arrangement of the said way-piece 17, will be seen by referring to Figs. 3, 6, and 11. Ways 18, are formed on either side so the guide-bar 1, may freely pass therein. At its side next to the supporting piece 13, and fitting into the concaved seat 16, is formed a ball or mound projection 19, which centrally has a hole 20, countersunk next the point where the guide bar passes. A bolt 21, having a flattened head 22, evenly fitted into the countersunk end of the hole 20, serves to permit the turning of and to hold the way-piece 17, in working place as shown in the several figures referred to. The hole 20, being formed so much larger than the diameter of the shank of the bolt 21, practically admits of the universal action of the ball or mound-like projection of the way-piece in the concaved seat where it and the connected supporting piece 13, may be adjusted and held in any position desired through tightening up on the nut $21^1$, provided for that purpose and at the pleasure of the operator.

In the supporting piece provision is made for supplementing a driving member or members in the gear train carried thereon to which reference has been made, and also for throwing free from collision with any adjacent parts of the ensilage machine the driving crank and such supplemental driving member or members and locking them in desired working position. By referring to Figs. 7, 8, and 14, the means for attaining this end is plainly shown. A swing bar 23, is pivoted on the stud 15. At its inner end it is flattened and provided with a curved slot 24, the arc of which is struck from the center of the said stud 15. A bolt 25, passes in the curved slot 24, and through the supporting piece 13, serving to retain the swing bar at any desired upward throw as seen in the dotted lines in Fig. 2. In proper place near its outer end is provided a stud 26, serving to carry the supplemental driving gear 27, with its driving crank 28, fastened thereon as seen in Figs. 2, and 3. A bolt 29, passing through the said swing-piece 23, and the supporting piece 13, serves to retain it in its normal alinement. when so desired. Should any part of the structure of the ensilage cutting machine by any possibility chance to interfere with the path of the driving crank as it is turned, the swing bar, after the releasement of the bolt 29, may be upwardly thrown, free of obstruction as has been said, and retained where desired by tightening the nut of the bolt 25, passing through the curved slot 24, as seen in Fig. 2, in the dotted lines. When a change of speed for the gear train may be deemed necessary, the swing-bar 23, and the controlling bolts 25, 29, are stripped from the supporting piece 13; the gear 30, of the stud 15, removed and replaced by the driving gear 27, with its crank 28, and the driving train substantially contracted as seen in Figs. 6, and 13.

The grinding or abrasive wheel 31, is recessed on the grinding side practically as seen in section in Figs. 3, and 6, and the rim thus formed is brought to bear on the cutting bevel of the knife through the following arrangement and operation of connected parts. It is carried on the end of a shaft 31, which is turned by the pinion $31^2$, meshing with the driving train as shown, and is supported in a box 32, that turns with a post 35, extended from its bottom side and which passes in a hole provided in the shell 33, extended at one end of the supporting piece 13. Between the top side of the box 32, and a suitable point on the supporting piece 13, is arranged the tensioned spiral spring 34, that pulls with a normal strain on the said box 32, thus bringing the side rim of the abrasive wheel 31, which is carried on the end of the shaft of the box as has been explained, to bear and to yield against the beveled edge of the knife being sharpened, following and yielding to its inequalities if any, during the operation of grinding. In Figs. 3, and 6, the action of the spiral spring relative to the box and abrasive wheel aforesaid, is clearly shown in the dotted lines. On the bottom end of the post 35, on which the box 32, turns, between the under side of the shelf and a nut on the end of the said post, is passed another spiral spring 36, by means of which the turning action of the box is retarded or released by screwing or unscrewing the aforesaid nut respectively and thus controlling its action as the operator wills.

The grinder with its connected parts carried on a straight guide bar 37,—shown in Fig. 13, can, as occasion demands, be utilized for sharpening or grinding other appliances. For such purpose it is desirable that the yieldable abrasive or grinding wheel should be rigid and positive in its grinding action, and holes 40, are provided in a projecting foot of the pivoted box 32, and the shelf 33, of the supporting piece 13, in line and opposite each other. A bolt 38, is passed in said holes thus blocking the turning action of the pivoted box 32, and keeping the abrasive wheel 31, which is mounted on the shaft 31¹, of said box, in a fixed position and in the same plane as that of the gear-train which actuates it. When the grinder is thus employed the straight guide bar 37,—see Fig. 13,—is clamped on a plank or other convenient support in the same manner that it is clamped on the arm of the cutter wheel or other part of the ensilage cutter as has been described. To prevent the supporting piece 13, with its connected parts from passing either end of the said guide bar 37, the latter is provided with holes near either end in which are passed bolts 39, which thus serve as stops to prevent the driving and grinding parts and the supporting piece 13, on which they are arranged, from passing either end of the said guide-bar as has been described.

Thus having given a detailed description of the several parts constituting my improvements, I will now describe the operation of the same. It being desired to grind an ensilage cutter or similar knife with a curved contour as to its edge, a single guide-bar that corresponds in curvature therewith is selected and the way-piece 18, of the supporting piece 13, passed thereon with the grinder-wheel 31, in a position bearing next to the knife 2, and directly opposite the edge of the same, when the whole is in approximate working place. The clamping piece is next passed on the arm of the cutter-wheel—or other convenient part of the machine,—and secured in position by screwing up on the set-screw 8,—see Fig. 4. A proper relative alinement between the supporting piece 13, and the guide bar is assured by loosening the nut of the bolt 6, which passes through the tapered lug 7, and secures the angle piece 4, to the guide bar, and then tightening up the set bolt 8, or the reverse, as the case may require, thus throwing it in or out of line as desired and bringing the grinder wheel in such contact with the knife as deemed necessary. An adjustment in the opposite direction is further secured by loosening and tightening the bolt 10, which passes in the slot 9, of the clamping piece 11, and secures the latter to the said angle-piece 4, as seen in Fig. 5. A further relative adjustment between the grinder wheel and edge of the knife is attained by loosening the flat headed bolt 21, of the universal joint between the way-piece 17, and the supporting piece 13, and tightening it up when the desired relation of each with the other is accomplished, when the whole is arranged for grinding the knife of the ensilage cutter wheel as seen in Figs. 1, 2, and 3. The handle 41, provided on the guide-bar side of the supporting piece 13, is grasped by the operator, and the said supporting piece with its connected parts raised and lowered on the guide-bar, while at the same operation the driving crank is turned operating the driving wheel of the train and the consequent rotation of the grinding wheel. The latter, as it is brought to bear against the edge of the knife in the movement aforesaid, yields to any inequalities or otherwise that may obtain in the knife through the action of the spring 34,—Fig. 3,—on the pivoted box 32, in which the shaft of the grinding wheel is mounted. The action of the said spring is regulated by a tension nut screwing on the end of the connecting bolt of the spring seen at 42, and the turning action of the pivoted box 32, is regulated by the tension nut 43, on the bottom end of the post 35, which bears against the spiral spring 36, carried thereon. During the above operation, the locking bolt 38, locking the foot of the pivoted box and the shelf 33, of the supporting piece 13, together, has been removed as seen in Fig. 6, thus allowing of the turning of the pivoted box and changing the said grinding wheel from a positive to a yielding factor. As the parts are thus operatively arranged and the grinding action begun, if found that the driving crank or any of its connected parts is liable to collide with any part of the ensilage machine, the swing bar 23, carrying the stud on which the driving wheel is turned, is released by the withdrawal of the bolt 29,—see Figs. 7, and 8,—the lossening of the bolt 25, in its curved slot 24, and then upwardly swung on the stud 15,—on which it is pivotally supported,—out of interference with any adjacent parts, to a position practically like that shown in the dotted lines in Fig. 2, the drive wheel riding on and driving its successor in the train, the said swing-bar being fixed in desired place through tightening the nut on the bolt 25, of the curved slot 24.

It will be seen a change of speed may be obtained by stripping the swing-bar from the stud on which it is pivoted, and substituting the drive wheel and crank for the wheel that was carried on the stud 15, which said change and substitution of parts is clearly shown in Figs. 6 and 13.

When the grinder is desired for use in grinding other utensils than the knives carried in place on the cutter wheels of ensilage cutters, the supporting piece carrying the driving train and grinder parts, is preferably passed on a guide-bar of straight pattern like that shown at 37, in Fig. 13, that is clamped on a plank or other convenient accessory as has been explained, and the stops 39, placed near either end thereof for keeping the said supporting piece and its connected parts from passing off the said guide bar.

Having thus described my improvements and their operation what I claim and desire to secure by Letters Patent from the United States of America, is:

1. In a grinder for ensilage cutter and other knives: a single guide bar having the shape of the contour of the knife, provided near its ends with holes for stops and means for a vertical connected adjustment having clamping means adapted for lateral adjustment and connection with the cutter wheel of the ensilage cutter, combined with a way piece connected with a supporting piece by a universal joint adapted to be fixed in desired position, said supporting piece having a shelf with a turning box carrying the shaft of the grinding wheel, and means between said box and said supporting piece for controlling the turning and also for locking the same, and further means below said shelf for controlling the turning of said box; said supporting piece having studs supporting the driving train and a swing bar having a stud and means for fixably adjusting it as desired, substantially as herein shown and described.

2. In a grinder for ensilage cutter and other knives, a guide bar conformable to the contour of the cutting edge of said knives provided near its ends with holes for stops and having a member provided with a tapered lug, a bolt and a set screw adapted for adjustment therewith; and a clamping piece having clamps, a clamping bolt and a slot, and adjustably attached to said member combined with a way piece and a supporting piece universally adjustable and connectible with each other; said supporting piece carrying a turning box having a shaft with an abrasive wheel, and studs carrying a train of wheels adapted to rotate the same; provided with means for keeping the turning box in a fixed position, and means on one of the aforesaid studs for throwing the driving member of the driving train to an upward fixed position substantially in the manner and for the purpose herein shown and described.

3. In a grinder for ensilage cutter and other knives a guide bar conformable to the contour of the cutting edge of said knives provided near its ends with holes for stops and having a member provided with a tapered lug, a bolt and a set-screw adapted for adjustment therewith; a clamping piece having clamps, a clamping bolt and a slot, and adjustably attached to said member, combined with a way-piece having ways on either side adapted to be universally adjustable and connectible with a supporting piece having studs carrying a train of wheels, and a swing bar, and a shelf; a turning box having a shaft carrying the abrasive or grinding wheel, a post passing through said shelf, a spring between it and said supporting piece, a spring on said post below said shelf and means for locking said turning box and said shelf to each other when desirable substantially constructed in the manner and for the purpose herein described and shown.

4. In a grinder for ensilage cutter and other knives a guide bar conformable to the contour of the cutting edge of said knives provided near its ends with holes for stops and having a member provided with a tapered lug, a bolt and a set screw adapted for adjustment therewith; and a clamping piece having clamps, a clamping screw and a slot, adjustably attached to said member; combined with a way-piece having ways and a bolt and adapted for universal adjustability and connection with a supporting piece having a shelf and studs carrying a driving train of wheels and a swing bar having a curved slot with a securing bolt at one end, and a stud at the other end supporting a drive wheel, and means for securing it in line with its train when desired; a turning box carrying the shaft of the abrasive or grinding wheel having a post passing through said shelf, a spiral spring having a tension nut arranged between said box and the supporting piece; a spring on said post below said shelf having a tension nut and means in said box and said shelf for locking both together substantially in the manner and for the purpose herein shown and described.

In testimony whereof I affix my signature, in presence of two witnesses.

ERNEST JOHN YOUNG.

Witnesses:
FRANK R. RATHBUN,
A. L. HEMINGWAY.

---

Copies of this patent may be obtained for five cents each, by addressing the "Commissioner of Patents, Washington, D. C."